(12) United States Patent
Okayama

(10) Patent No.: US 9,419,690 B2
(45) Date of Patent: Aug. 16, 2016

(54) METHOD FOR SELECTION OF RECEIVED TELEGRAM IN TRAIN WIRELESS COMMUNICATIONS SYSTEM

(71) Applicant: HITACHI KOKUSAI ELECTRIC INC., Tokyo (JP)

(72) Inventor: Koichiro Okayama, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/429,386

(22) PCT Filed: Aug. 26, 2013

(86) PCT No.: PCT/JP2013/072757
§ 371 (c)(1),
(2) Date: Mar. 19, 2015

(87) PCT Pub. No.: WO2014/045806
PCT Pub. Date: Mar. 27, 2014

(65) Prior Publication Data
US 2015/0256232 A1 Sep. 10, 2015

(30) Foreign Application Priority Data

Sep. 20, 2012 (JP) .................................. 2012-207119

(51) Int. Cl.
*H04B 7/02* (2006.01)
*H04W 4/04* (2009.01)
(Continued)

(52) U.S. Cl.
CPC *H04B 7/022* (2013.01); *H04L 1/02* (2013.01); *H04W 4/046* (2013.01); *H04W 4/12* (2013.01); *H04W 16/28* (2013.01); *H04W 88/02* (2013.01); *H04W 64/00* (2013.01)

(58) Field of Classification Search
CPC ......... H04B 7/022; H04L 1/02; H04W 16/28; H04W 4/046; H04W 4/12; H04W 64/00; H04W 88/02

USPC ........... 455/524, 522, 512, 277.1, 277.2, 134, 455/133, 33.1, 66, 13.1, 41.2; 701/19, 20; 370/330, 329, 390, 386, 328; 340/425.5, 5.2, 988, 539.13, 572.4, 340/10.1; 246/167
See application file for complete search history.

(56) References Cited

U.S. PATENT DOCUMENTS 3,808,426 A * 4/1974 Birkin ..................... B61L 3/125
246/30
4,023,753 A * 5/1977 Dobler ................... B60L 27/04
246/122 R
(Continued)

FOREIGN PATENT DOCUMENTS

EP 1 601 136 A1 11/2005
EP 2 472 808 7/2012
(Continued)

OTHER PUBLICATIONS

International Search Report for PCT/JP2013/072757, ISA/JP, mailed Nov. 19, 2013.
(Continued)

*Primary Examiner* — Tan H Trinh
(74) *Attorney, Agent, or Firm* — Harness, Dickey & Pierce, PLC

(57) ABSTRACT

A method for selection of a received telegram in a train wireless communications system including a plurality of wireless base stations situated along the train tracks, for respectively communicating with a higher level device through a wired circuit, and at least one terminal having at least two or more antennas installed in cars of the train moving down the track, during a predetermined transmission interval of a downstream telegram received from a higher level device, the wireless base station twice transmits telegrams that include at least identical content; the terminal, using the plurality of antennas, receives the telegrams transmitted by the wireless base station, selects the received telegram having the best reception from among those received by the plurality of antennas as the received telegram, and transmits a response telegram to the wireless base station, in response to the telegram received from the wireless base station.

1 Claim, 10 Drawing Sheets

(51) Int. Cl.
  *H04L 1/02*      (2006.01)
  *H04W 16/28*     (2009.01)
  *H04W 88/02*     (2009.01)
  *H04W 4/12*      (2009.01)
  *H04W 64/00*     (2009.01)

(56) References Cited

U.S. PATENT DOCUMENTS

| | | | | |
|---|---|---|---|---|
| 5,548,835 A * | 8/1996 | Sasaki | ............ | H04B 7/0805 |
| | | | | 455/133 |
| 9,166,952 B2 * | 10/2015 | Siu | ............ | B61L 15/0027 |
| 9,324,230 B2 * | 4/2016 | Chutorash | ............ | G08C 17/02 |
| 2002/0057688 A1 * | 5/2002 | Hamasaki | ............ | H04Q 11/0062 |
| | | | | 370/390 |
| 2003/0112131 A1 * | 6/2003 | McAllister | ............ | B61L 1/188 |
| | | | | 340/425.5 |
| 2003/0222180 A1 * | 12/2003 | Hart | ............ | B61L 27/0038 |
| | | | | 246/167 R |
| 2005/0118993 A1 * | 6/2005 | Roux | ............ | H04B 7/022 |
| | | | | 455/423 |
| 2005/0220050 A1 * | 10/2005 | Uchida | ............ | H04W 4/10 |
| | | | | 370/329 |
| 2006/0195236 A1 * | 8/2006 | Katsuta | ............ | B61L 11/08 |
| | | | | 701/9 |
| 2007/0296591 A1 * | 12/2007 | Frederick | ............ | G08B 13/2488 |
| | | | | 340/572.4 |
| 2010/0144284 A1 * | 6/2010 | Chutorash | ............ | G08C 17/02 |
| | | | | 455/66.1 |
| 2012/0197466 A1 * | 8/2012 | Yoshimoto | ............ | B60L 15/40 |
| | | | | 701/20 |
| 2013/0006452 A1 * | 1/2013 | Takagi | ............ | B60L 15/20 |
| | | | | 701/20 |
| 2013/0272221 A1 * | 10/2013 | Hoehne | ............ | H04L 45/24 |
| | | | | 370/329 |
| 2014/0348124 A1 * | 11/2014 | Hasegawa | ............ | H04B 1/7143 |
| | | | | 370/330 |

FOREIGN PATENT DOCUMENTS

| | | |
|---|---|---|
| JP | H05-284075 A | 10/1993 |
| JP | H07-162349 A | 6/1995 |
| JP | 2009-225135 A | 10/2009 |

OTHER PUBLICATIONS

Extended Search Report dated Apr. 11, 2016 in corresponding EP Application No. 13839647.

\* cited by examiner

METHOD FOR SELECTION OF RECEIVED TELEGRAM IN TRAIN WIRELESS COMMUNICATIONS SYSTEM

CROSS-REFERENCE TO RELATED APPLICATIONS

This application is a 371 U.S. National Stage of International Application No. PCT/JP2013/072757, filed Aug. 26, 2013, and published in Japanese as WO 2014/045806 A1 on Mar. 27, 2014, which claims the benefit of priority from Japanese Patent Application No. 2012-207119, filed Sep. 20, 2012. The entire disclosures of the above applications are incorporated herein by reference.

TECHNICAL FIELD

The present invention relates to train wireless communication systems, and in particular relates to the method of selection of a received telegram message in a train wireless communication system adapted for communication between a wireless base station and an on-board wireless terminal of a moving train.

BACKGROUND ART

In recent years, the use of a wireless system that uses the radio frequency of 26 GHz band as a short distance wireless communication system has been expanding.

The examples of a railway control system using a 2.4 GHz-band wireless communication system include a CBTC (Communication Based Train Control) system (e.g., see Patent Literature 1).

CITATION LIST

Patent Literature

Patent Literature 1: JP-A-2009-225135

SUMMARY OF INVENTION

Technical Problem

The purpose of the present invention is to provide a train wireless communication system adapted for communication between a plurality of wireless base stations and an on-board wireless terminal on a moving train, in which a telegram message having the best reception condition is selected from among telegram messages received by the on-board wireless terminal.

Solution to Problem

According to an aspect of the present invention, there is provided a method for selection of a received telegram message in a train wireless communication system comprising: a plurality of wireless base stations arranged along the track of a train, each wireless base station communicating with a higher level device through a wired line; and at least one terminal having at least two or more antennas installed in a car of the train moving on the track, during a predetermined transmission interval, the wireless base station transmits at least twice a downstream telegram message, which is received from the higher level device, as a telegram message that includes an identical content; and the terminal receives, with the plurality of antennas, a telegram message transmitted from the wireless base station, selects the received telegram message having the best reception condition from among the telegram messages received with the plurality of antennas as a received telegram message, and transmits a response telegram message to the wireless base station in response to the telegram message received from the wireless base station.

According to another aspect of the present invention, there is provided the above-described method, the base station receives the response telegram messages transmitted from the terminal in response to the telegram message that has been transmitted twice as the telegram message that includes at least an identical content, respectively, selects, as a received telegram message, a response telegram message having the best reception condition from among the response telegram messages, and transmits the same to the higher level device.

According to yet another aspect of the present invention, there is provided a method for selection of a received telegram message in a train wireless communication system comprising: a plurality of wireless base stations arranged along the track of a train, each wireless base station communicating with a higher level device through a wired line; and at least one terminal installed in a car of the train moving on the track, during a predetermined transmission interval, the each wireless base station transmits at least twice a downstream telegram message, which is received from the higher level device, as a telegram message that includes an identical content; the terminal receives the telegram message transmitted from the wireless base station, and transmits a response telegram message to the base station in response to the received telegram message transmitted from the base station, and the base station receives the response telegram messages transmitted from the terminal in response to the telegram message that has been transmitted twice as the telegram message that includes at least an identical content, respectively, selects, as the received telegram message, a response telegram message having the best reception condition from among the response telegram messages, and transmits the same to the higher level device.

Advantageous Effects of Invention

According to the present invention, a plurality of wireless base stations transmits an identical telegram message multiple times, and an on-board wireless terminal can select the telegram message having the best reception condition among the received telegram messages.

Thanks to the time diversity of the present invention, it is possible to receive a telegram message with a reduced effect of electromagnetic interferences, such as fading.

DESCRIPTION OF EMBODIMENTS

Hereinafter, embodiments of the present invention will be described with reference to the accompanying drawings.

Figure 1:
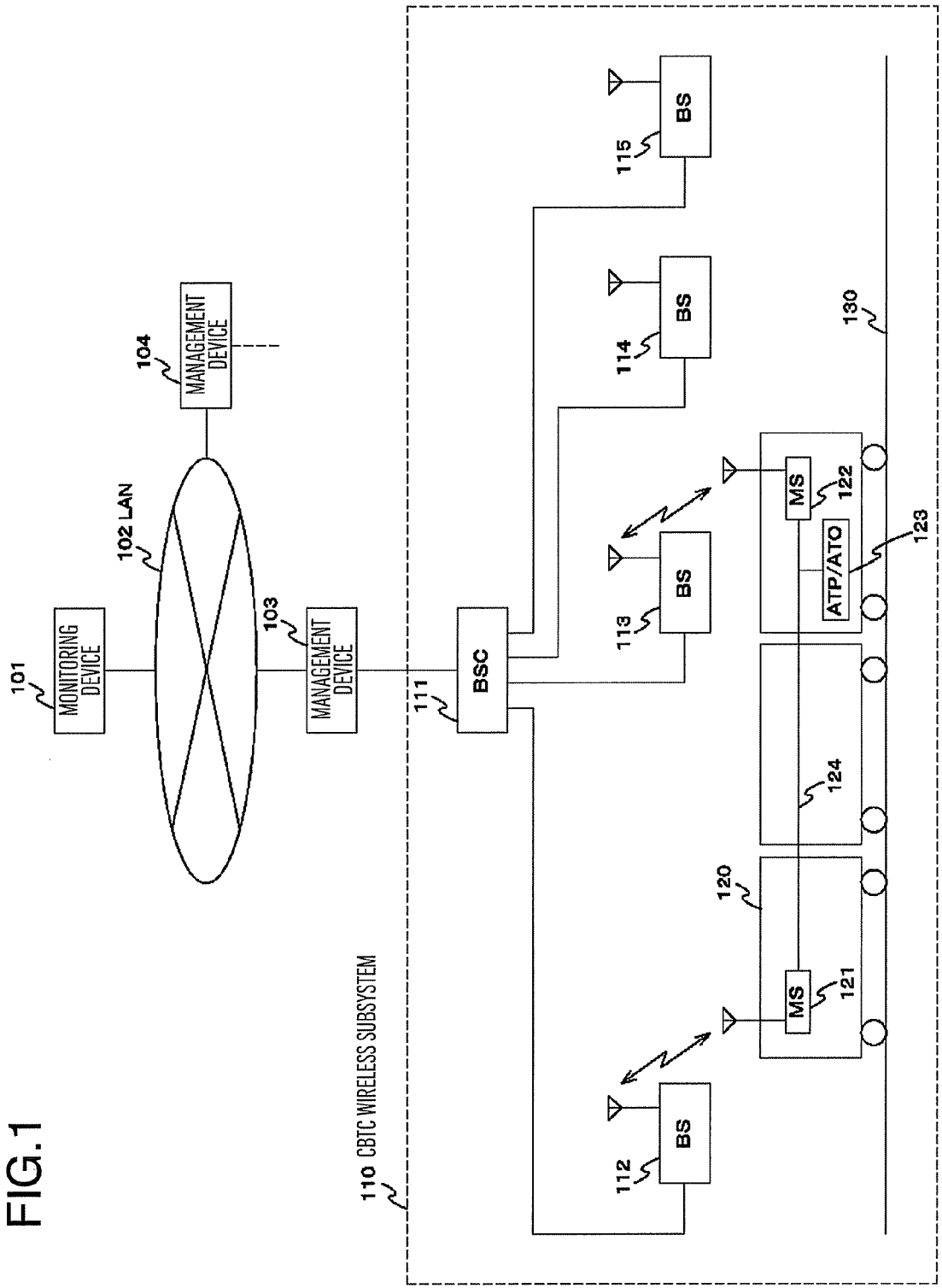
FIG. 1 is a view illustrating the whole configuration of a CBTC wireless communication system to which the present invention is applied.

FIG. 1 is a view illustrating the whole configuration of a CBTC (Communication Based Train Control) wireless communication system to which the present invention is applied.

In FIG. 1, a monitoring device 101 and management devices 103 and 104 are connected to a LAN (Local Area Network) 102.

The monitoring device 101 monitors the operation of a train via the LAN 102.

The management devices 103 and 104 secure the safety operation of a train 120 by managing the operation information about the train in a predetermined zone, and are connected to a Base Station Master (hereinafter, referred to as BSC) 111 installed in the zone of a CBTC wireless subsystem 110.

The BSC 111 is connected to a plurality of wireless base stations (hereinafter, each is referred to as a Base Master: BS) 112 to 115 installed along a track 130 of the train, and serves as a relay device that relays uplink/downlink telegram messages (communication messages) between these BSs and the management device 103. Each of the BS 112 to BS 115 wirelessly transmits a downlink telegram message received from the BSC 111, and transfers to the BSC 111 an uplink telegram message that is wirelessly received from the train 120.

In each train 120 moving on the track 130, on-board wireless terminals (hereinafter, each is referred to as a Mobile Station: MS) 121 and 122 are installed in a front car and a rear car. The front car may be the first car or may be the second car, and the rear car may be the last car or may be the car proceeding to the last car. These MS 121 and MS 122 are connected to an on-board controller: ATP/ATO (Automatic Train Protection/Automatic Train Operation) 123 installed in the front car, via a communication line 124 in the train. The ATP/ATO 123 includes a display device for displaying a command given from the management device 103, and further includes, for example, an alarm-output device for notifying an operating staff of an alarm and a GPS (Global Positioning System) for measuring the current location of the train, in addition to the display device.

The MS 121 and MS 122 installed in the train 120 wirelessly communicate with the BS 112 to BS 115 positioned within a communication area, receive via the BS 112 to BS 115 a downlink telegram message transmitted from the management device 103, transfer the same to the ATP/ATO 123, and wirelessly transmit to the BS 112 to BS 115 an uplink telegram message generated by the ATP/ATO 123.

The ATP/ATO 123 extracts a message transmitted by the management device 103 from the downlink telegram message received by the MS 121 and MS 122, displays a received message, and performs a control action in response to a control instruction indicated by the received message. The ATP/ATO 123 generates an uplink telegram message including the status information, such as the location of the train detected by the GPS, and the identifier of the train, and transmits the generated uplink telegram message from the MS 121 and MS 122 at a predetermined timing as described later. In the embodiment, a case is described where one MS is installed in the front car of the train 120 and one MS is installed in the rear car, but three or more MSs may be installed in one and the same train in order to improve the diversity effect.

Figure 2:
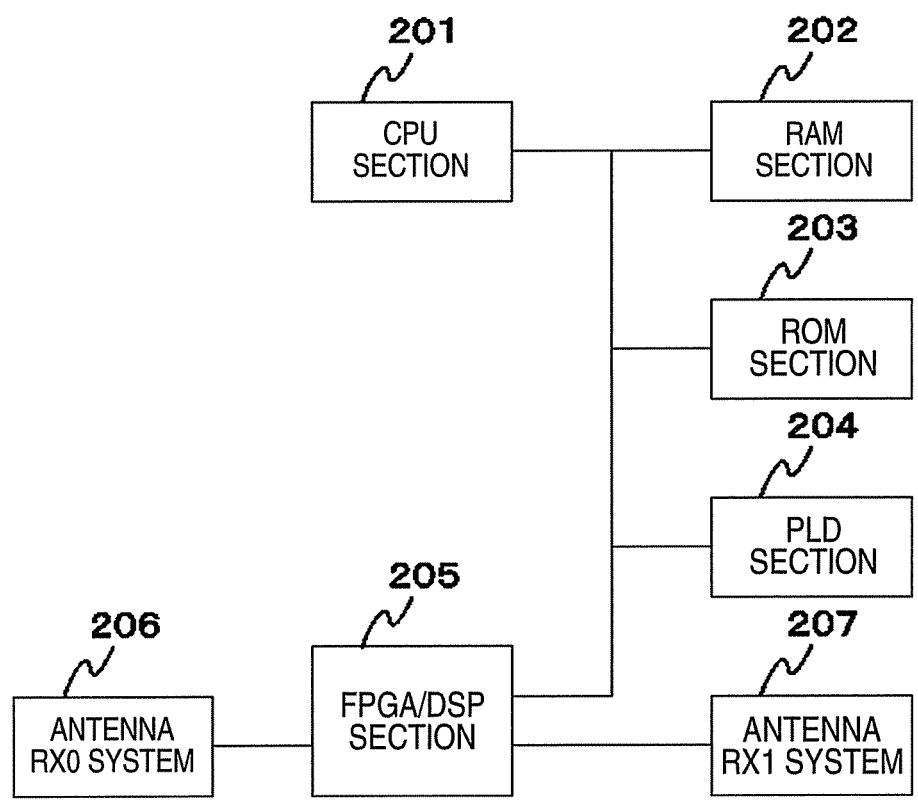
FIG. 2 is a block diagram of an on-board wireless terminal that is an embodiment of the present invention.

FIG. 2 is a block diagram of the on-board wireless terminal that is an embodiment of the present invention.

In FIG. 2, the MS 121 and 122 each include an antenna RX0 system 206, an antenna RX1 system 207, an FPGA/DSP (Field Programmable Gate Array/Digital Signal Processor) section 205 configured to transmit and receive radio data, a PLD (Programmable Logic Device) section 204 having an interface function to connect to the outside and the like, a CPU (Central Processing Unit) section 201 configured to control the terminal, a ROM (Read Only Memory) section 203 having stored therein the software for operating the CPU section 201 and the like, and a RAM (Random Access Memory) section 202 configured to temporarily store a memory table of a radio status and the like.

Figure 3:
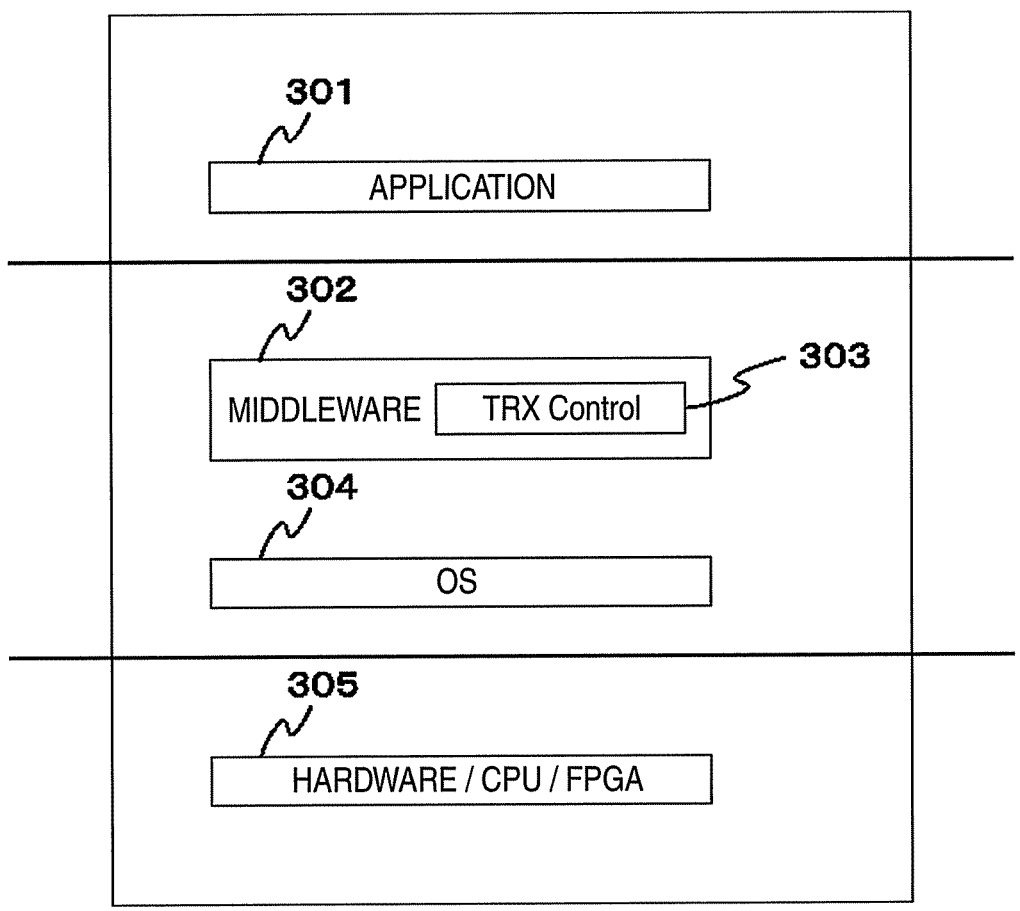
FIG. 3 is a view illustrating the configuration of software of the on-board wireless terminal that is an embodiment of the present invention.

FIG. 3 is a view illustrating the configuration of software of the on-board wireless terminal that is an embodiment of the present invention.

The software of FIG. 3 comprises application 301, middleware 302, an OS (Operation System) 304, and hardware/CPU/FPGA305 for operating the PLD section 204, CPU section 201, and FPGA/DSP section 205.

The time diversity is controlled by a TRX Control 303 inside the middleware 302. The TRX Control 303 is controlled by the CPU section 201 and receives radio data (a telegram message) from the FPGA/DSP section 205.

First Embodiment

Next, the operation of the time diversity that is an embodiment of the present invention is described using FIG. 1 to FIG. 6.

In the embodiment, the operation is described by limiting to the management device 103, BSC 111, BS 113, MS 122, and ATP/ATO 123. Assume that the MS 121 will not involve in the operation of the embodiment. Further assume that the antenna RX1 system 207 of the MS 122 will not involve in the operation of the embodiment, either.

Figure 4:
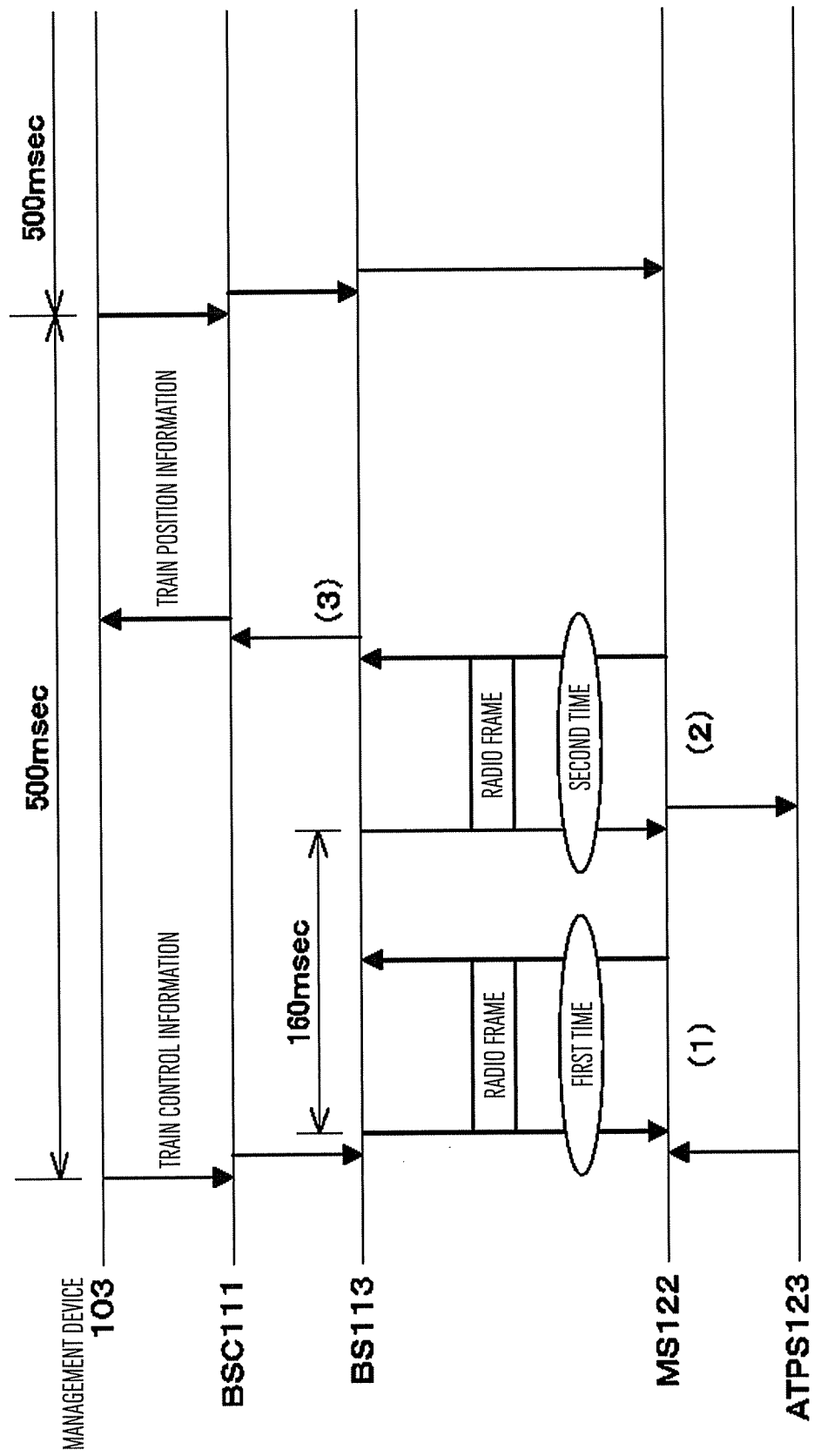
FIG. 4 is a view for explaining the control of the CBTC wireless subsystem that is an embodiment of the present invention.

FIG. 4 is a view for explaining the control of the CBTC wireless subsystem 110 that is an embodiment of the present invention.

In FIG. 4, the management device 103 transmits a telegram message that is train control information to the BS 113 via the BSC 111.

In an embodiment of the present invention, the management device 103 transmits the train control information at every 500 msec that is a predetermined cycle.

The BS 113 transmits a telegram message that includes an identical content to the MS 122 at least twice at a predetermined interval specified by a system parameter. Note that, the system parameter is a variable parameter, and in the embodiment the predetermined interval specified by the system parameter is an interval of 160 msec as an example, but not limited thereto.

The MS 122 obtains train location information and the like from the ATP/ATO 123.

The MS 122 receives a first-time telegram message transmitted from the BS 113, and transmits a response telegram message that includes the location information and the like about the train to the BS 113.

Furthermore, the MS 122 receives a second-time telegram message transmitted from the BS 113, and transmits a response telegram message that includes the location information and the like about the train to the BS 113. Note that the MS 122 may transmit a telegram message having a better reception condition to the ATP/ATO 123.

The BS 113 selects a response telegram message having a better reception condition from among the response telegram messages including two times of train location information and the like transmitted from the MS 122, and transmits the same to the management device 103 via the BSC 111.

Figure 5:
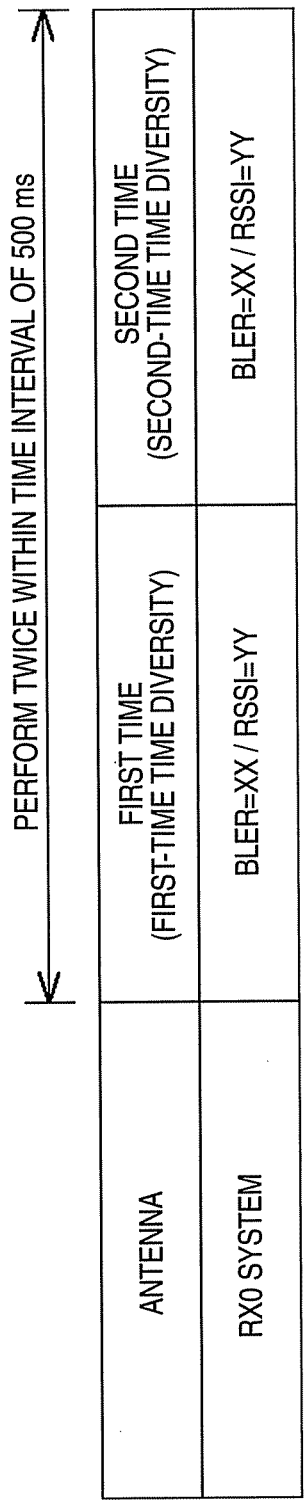
FIG. 5 is a memory table for explaining the radio wave condition of a telegram message to be stored into a RAM section of the on-board wireless terminal that is an embodiment of the present invention.

FIG. 5 is a memory table for explaining the radio wave condition of a telegram message to be stored into a RAM section 202 of the on-board wireless terminal that is an embodiment of the present invention.

The BS 113 transmits a telegram message that includes an identical content at least twice within an interval of 500 ms.

The MS 122 receives the telegram message transmitted from the BS 113, with the antenna RX0 system 206.

The memory table obtains a BLER (BLock Error Rate) and a RSSI (Received Signal Strength Indication) from the telegram message received through the first-time time diversity and the second-time time diversity and stores the obtained data.

"XX" in BLER=XX indicates whether or not an error exists, where the non-error existing corresponds to "0" and an error existing corresponds to "1".

"YY" in RSSI=YY indicates the value of reception sensitivity, where the higher the value, the better the reception sensitivity.

Figure 6:
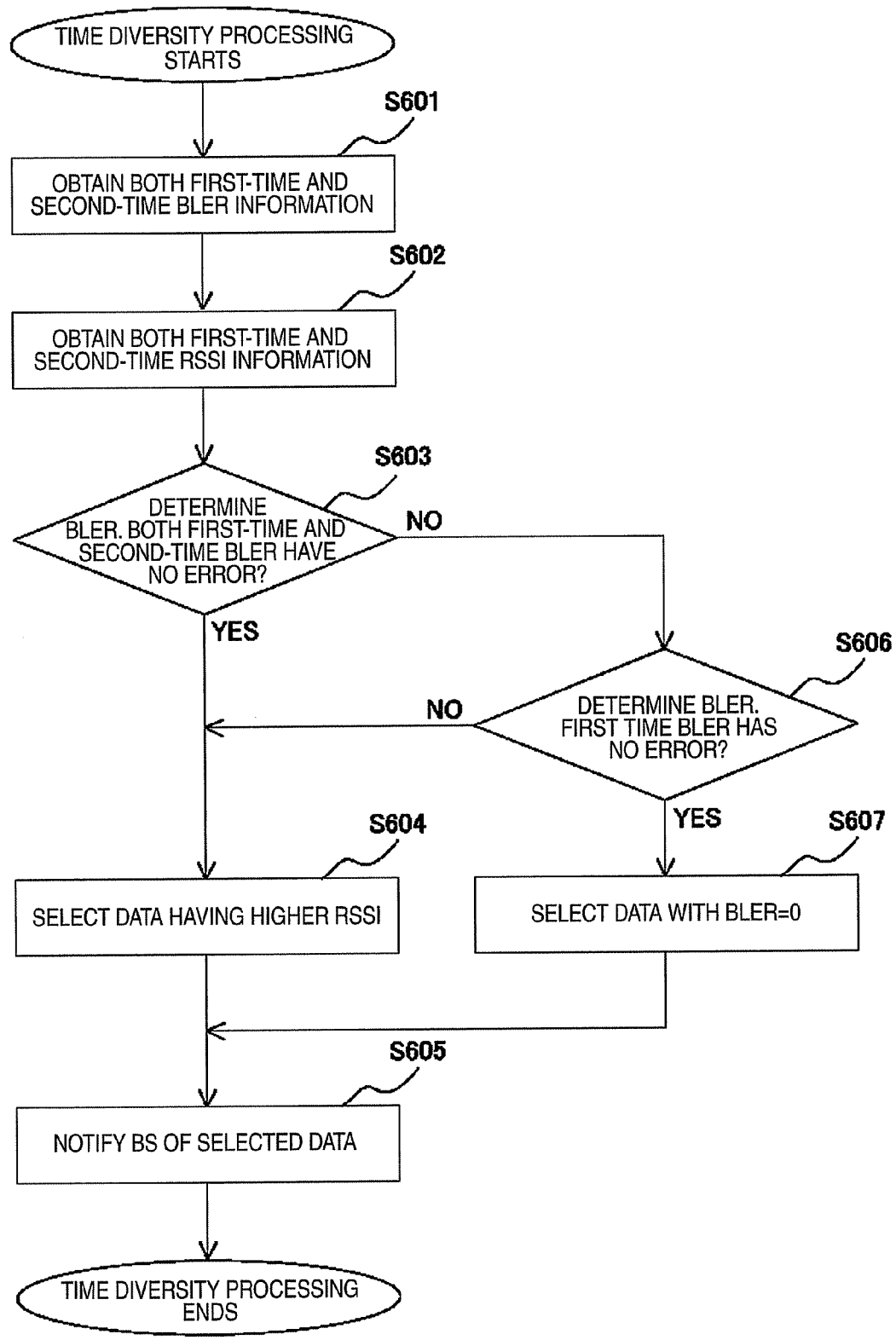
FIG. 6 is a flow chart for explaining the time diversity processing performed by the on-board wireless terminal that is an embodiment of the present invention.

FIG. 6 is a flow chart for explaining the time diversity processing performed by the on-board wireless terminal that is an embodiment of the present invention.

The CPU section 201 of the MS 122 reads and obtains the first-time and second-time BLER information from the memory table stored in the RAM section 202, in step S601. After obtaining the first-time and second-time BLER information, the flow proceeds to step S602.

In step S602, the first-time and second-time RSSI information are read and obtained from the memory table stored in the RAM section 202. After obtaining the first-time and second-time RSSI information, the flow proceeds to step S603.

In step S603, it is determined whether both the first-time BLER and second-time BLER have no error: indicated by "0", and when the both have no error: indicated by "0" (YES), the flow proceeds to step S604, while when either of or both the first-time BLER and second-time BLER has or have an error: indicated by "1" (NO), the flow proceeds to step S606.

In step S606, it is determined whether the first-time BLER has no error, and when it has no error: indicated by "0" (YES), the flow proceeds to step S607 while when it has an error: indicated by "1" (NO), the flow proceeds to step S604.

In step S604, data (telegram message) having a higher reception sensitivity is selected based on the first-time and second-time RSSI information, and then the flow proceeds to step S605.

In step S607, data (a telegram message) when the first-time BLER and second-time BLER have no error: indicated by "0", is selected, and then the flow proceeds to step S605.

In step S605, the selected data (telegram message) and the train location information are transmitted to the BS 113 and the time diversity processing is completed.

This processing allows the MS 122 to select data (a telegram message) having a better radio quality from among the data (telegram messages) transmitted from the BS 113.

Second Embodiment

Next, the operation of a combination of time diversity and antenna diversity that is another embodiment of the present invention is described using FIG. 1 to FIG. 4 and FIG. 7 to FIG. 10.

In the embodiment, the operation is described by limiting to the management device 103, BSC 111, BS 113, MS 122, and ATP/ATO 123. Assume that the MS 121 will not involve in the operation of the embodiment.

Next, the control of the CBTC wireless subsystem 110 that is another embodiment of the present invention is described using FIG. 4.

FIG. 4 is a view for explaining the control of the CBTC wireless subsystem 110 that is an embodiment of the present invention.

In FIG. 4, the management device 103 transmits a telegram message that is train control information to the BS 113 via the BSC 111.

In another embodiment of the present invention, the management device 103 transmits train control information at every 500 msec that is a predetermined cycle.

The BS 113 transmits a telegram message that includes an identical content to the MS 122 at least twice at a predetermined interval specified by a system parameter. Note that, the system parameter is a variable parameter, and in the embodiment the predetermined interval specified by the system parameter is an interval of 160 msec as an example, but not limited thereto.

The MS 122 obtains train location information and the like from the ATP/ATO 123.

The MS 122 receives a first-time telegram message transmitted from the BS 113, and transmits a response telegram message that includes the location information and the like about the train to the BS 113.

Furthermore, the MS 122 receives a second-time telegram message transmitted from the BS 113, and transmits a response telegram message that includes the location information and the like about the train to the BS 113. Note that the MS 122 may transmit a telegram message having a better reception condition to the ATP/ATO 123.

The control in FIG. 4 is performed on both a telegram message received with the antenna RX0 system 206 of the MS 122 and on a telegram message received with the antenna RX1 system 207.

The BS 113 selects a response telegram message having the best reception condition from among the response telegram messages including four times of train location information transmitted from the MS 122, and transmits the same to the management device 103 via the BSC 111.

Figure 7:
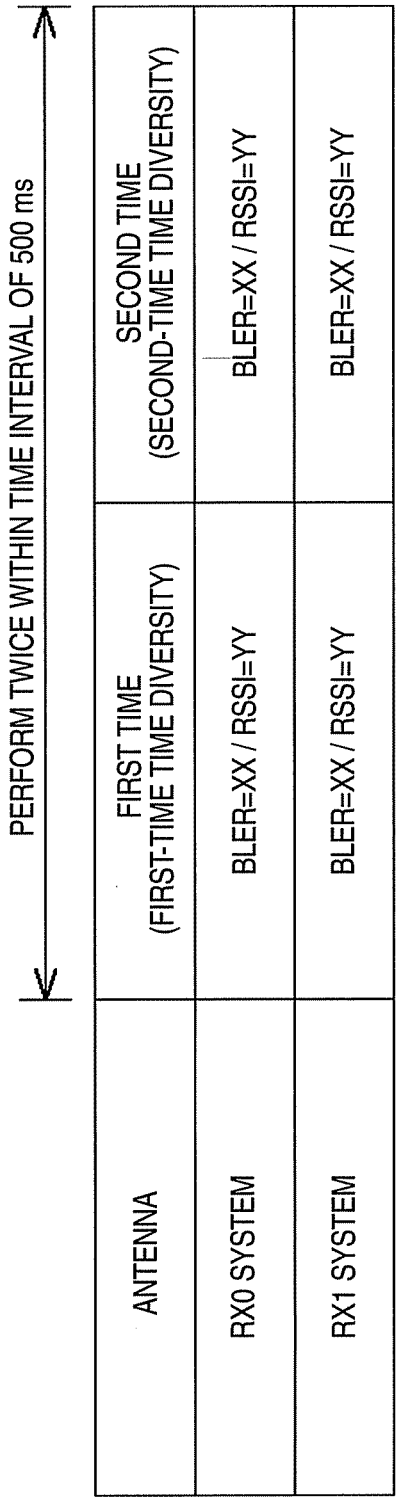
FIG. 7 is a memory table for explaining the radio wave condition of a telegram message to be stored into the RAM section of an on-board wireless terminal that is another embodiment of the present invention.

FIG. 7 is a memory table for explaining the radio wave condition of a telegram message to be stored into the RAM section 202 of the on-board wireless terminal that is another embodiment of the present invention.

The BS 113 transmits a telegram message that includes an identical content at least twice within an interval of 500 ms The MS 122 receives the two telegram messages transmitted from the BS 113, with the antenna RX0 system 206.

The memory table obtains BLER and RSSI from the telegram message of the first-time time diversity and the telegram message of the second-time time diversity that are received with the antenna RX0 system 206, and stores the obtained data.

Next, the MS 122 receives the two telegram messages transmitted from the BS 113, with the antenna RX1 system 207.

The memory table obtains BLER and RSSI from the telegram message of the first-time time diversity and the telegram message of the second-time time diversity that are received with the antenna RX1 system 207, and stores the obtained data.

"XX" in BLER=XX indicates whether or not an error exists, where the non-error existing corresponds to "0" and the error existing corresponds to "1".

"YY" in RSSI=YY indicates the value of reception sensitivity, where the higher the value, the better the reception sensitivity.

Figure 8:
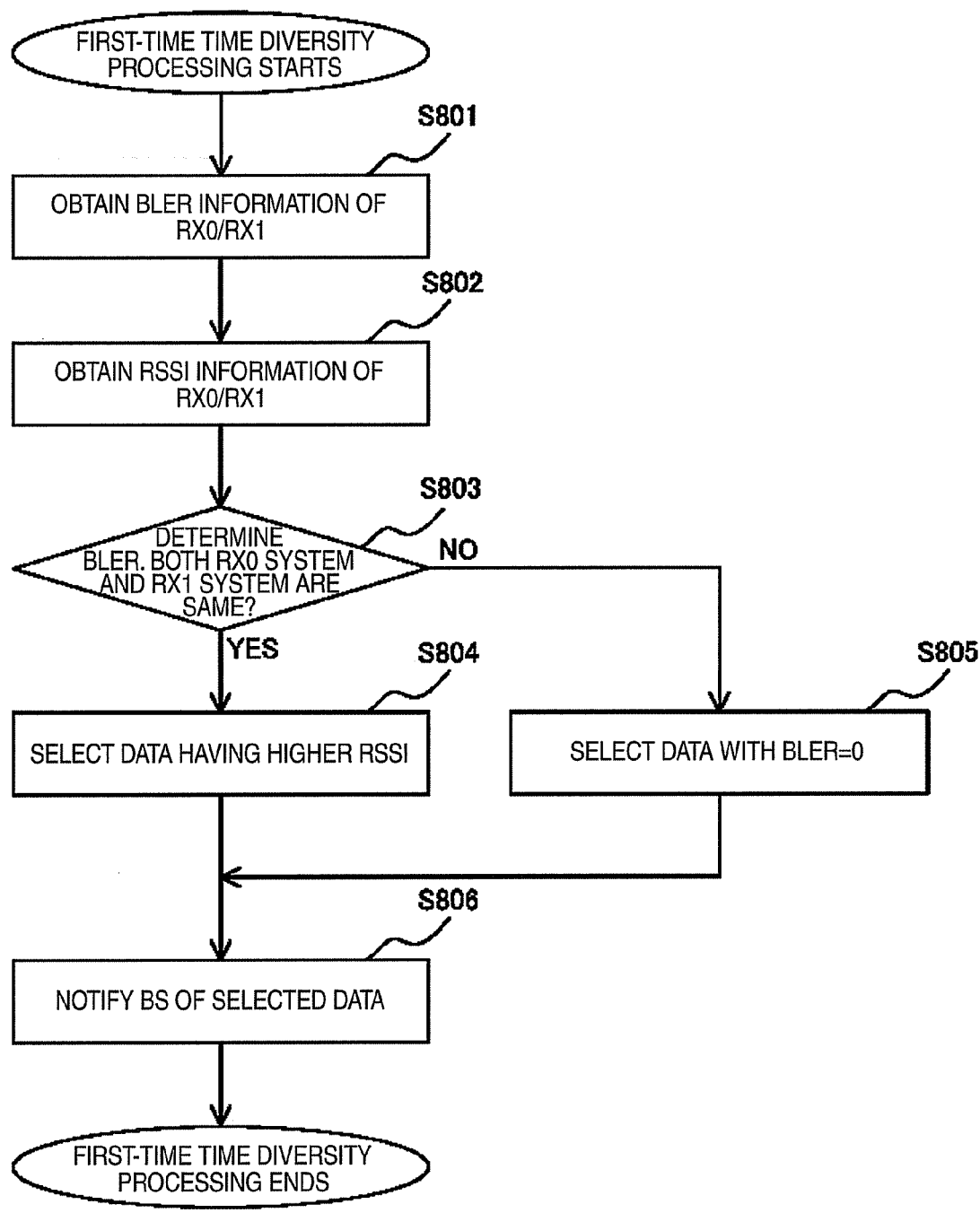
FIG. 8 is a flow chart for explaining the first-time time diversity processing performed by the on-board wireless terminal that is another embodiment of the present invention.

FIG. 8 is a flow chart for explaining the first-time time diversity processing performed by the on-board wireless terminal that is another embodiment of the present invention.

The CPU section 201 of the MS 122 reads and obtains the BLER information of the antenna RX0 system 206 and the BLER information of the antenna RX1 system 207 from the memory table stored in the RAM section 202, in step S801. After obtaining these BLER information, the flow proceeds to step S802.

In step S802, the RSSI information of the antenna RX0 system 206 and the RSSI information of the antenna RX1 system 207 are read and obtained from the memory table stored in the RAM section 202. After obtaining these RSSI information, the flow proceeds to step S803.

In step S803, it is determined whether BLER is the same between the antenna RX0 system 206 and the antenna RX1 system 207, and when it is the same (YES), the floe proceeds to step S804, while when it is different (NO), the flow proceeds to step S805.

In step S804, data (a telegram message) having a higher reception sensitivity is selected based on the RSSI information, and then the flow proceeds to step S806.

In step S805, the data (telegram message) with BLER=0 is selected from among the data of the antenna RX0 system 206 and of the antenna RX1 system 207, and then the flow proceeds to step S806.

In step S806, the selected data (telegram message) and the train location information are transmitted to the BS 113, and then the first-time time diversity processing is completed.

Figure 9:
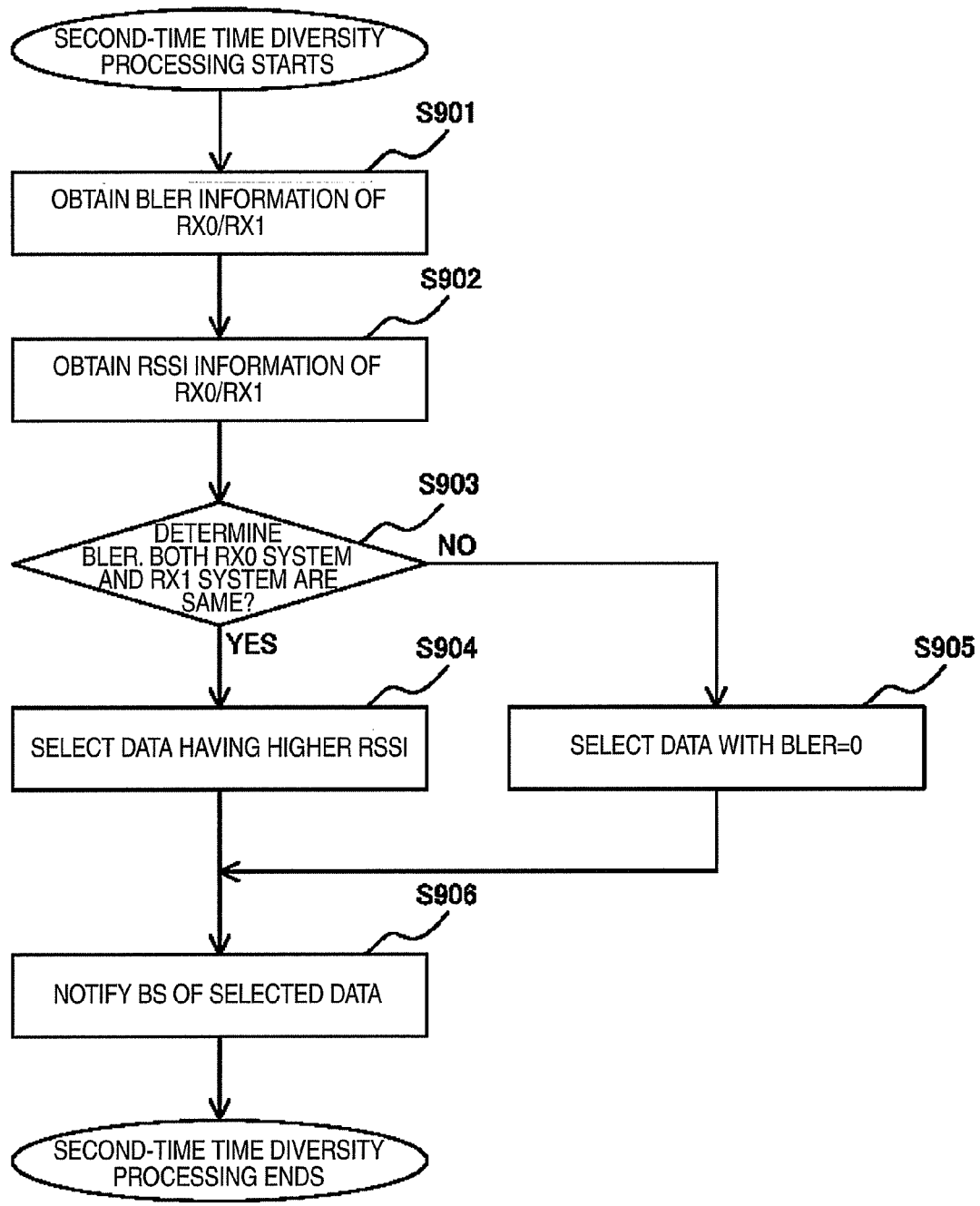
FIG. 9 is a flow chart for explaining the second-time time diversity processing performed by the on-board wireless terminal that is another embodiment of the present invention.

FIG. 9 is a flow chart for explaining the second-time time diversity processing performed by the on-board wireless terminal that is another embodiment of the present invention.

The CPU section 201 of the MS 122 reads and obtains the BLER information of the antenna RX0 system 206 and the BLER information of the antenna RX1 system 207 from the memory table stored in the RAM section 202, in step S901. After obtaining these BLER information, the flow proceeds to step S902.

In step S902, the RSSI information of the antenna RX0 system 206 and the RSSI information of antenna RX1 system 207 are read and obtained from the memory table stored in the RAM section 202. After obtaining these RSSI information, the flow proceeds to step S903.

In Step S903, it is determined whether BLER is the same between the antenna RX0 system 206 and the antenna RX1 system 207, and when it is the same (YES), the floe proceeds to step S904, while when it is different (NO), the flow proceeds to step S905.

In Step S904, data (a telegram message) having a higher reception sensitivity is selected based on the RSSI information, and then the flow proceeds to step S906.

In step S905, the data (telegram message) with BLER=0 is selected from among the data of the antenna RX0 system 206 and of the antenna RX1 system 207, and then the flow proceeds to step S906.

In Step S906, the selected data (telegram message) and the train location information are transmitted to the BS 113, and then the second-time time diversity processing is completed.

Figure 10:
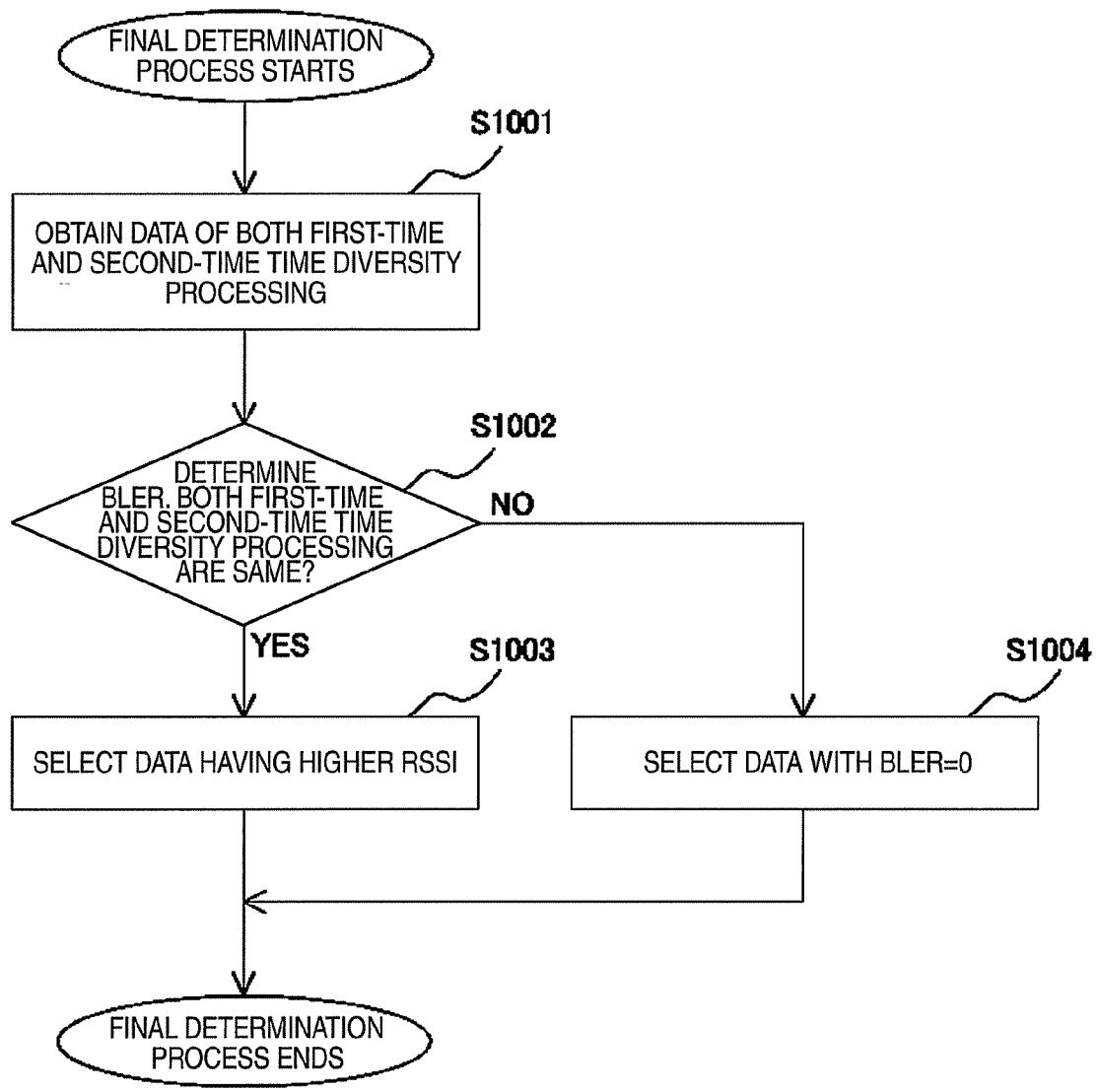
FIG. 10 is a flow chart for explaining the final determination process performed by a wireless base station that is another embodiment of the present invention performs.

FIG. 10 is a flow chart for explaining the final determination process performed by the wireless base station that is another one embodiment of the present invention performs.

The BS 113 obtains the resulting data of the first-time and second-time time diversity processing transmitted from the MS 122, in step S1001, and then the flow proceeds to step S1002.

In step S1002, it is determined whether both the first-time BLER and the second-time BLER have the same data, i.e., the both have no error: indicated by "0", or the both have an error: indicated by "1", and when both the first-time BLER and the second-time BLER have the same data: indicated by "YES", the flow proceed to step S1003, while when both the first-time BLER and the second-time BLER have different data: indicated by "NO", the flow proceed to step S1004.

In step S1003, data (a telegram message) having a higher reception sensitivity is selected based on the first-time and second-time RSSI information, and the final determination process is completed.

In step S1004, the data (telegram message) with BLER=0 is selected and the final determination process is completed.

This determination process allows the BS 113 to select data having a better radio quality from among the data transmitted from the MS 112.

In the above-described embodiments, MS and ATP/ATO are described as separate devices, but MS may include the function of ATP/ATO.

In the above-described embodiments, assume that MS has two antennas and antenna diversity is implemented using signals received with these two antennas, but the antenna diversity may be implemented using one antenna of the front terminal and one antenna of the rear terminal of a train. In this case, data selection is performed in ATP/ATO.

According to the present invention, a plurality of wireless base stations transmit an identical telegram message multiple times, and an on-board wireless terminal can select the telegram message having the best reception condition among the received telegram messages.

Thanks to the time diversity of the present invention, it is possible to receive a telegram message with a reduced effect of electromagnetic interferences, such as fading.

Although the present invention has been described above in detail, it should be readily apparent that the present invention is not limited to the train wireless communication system described herein and can be widely applied to wireless communication systems other than the above-described one.

INDUSTRIAL APPLICABILITY

The present invention is suitable for a train wireless communication system comprising a plurality of wireless base stations and an on-board wireless terminal of a moving train, each wireless base station communicating with the on-board wireless terminal, in which electromagnetic interferences, such as fading, may be generated.

REFERENCE SIGNS LIST

101: monitoring device,
102: LAN, 103, 104: management device,
110: CBTC wireless subsystem,
111: BSC,
112 to 115: BS,
120: train,
121,122: MS,
123: ATP/ATO,
130: track

The invention claimed is:

1. A method for selection of a received telegram message in a train wireless communication system comprising: a plurality of wireless base stations arranged along a track of a train, each wireless base station communicating with a higher level device through a wired line; and at least one terminal having at least two or more antennas installed in a car of the train moving on the track, comprising the steps of:
  transmitting, by the wireless base station, at least twice a downstream telegram message, which is received from the higher level device, as a telegram message that includes an identical content, during a predetermined transmission interval;
  receiving, by the terminal, a first telegram message of the telegram messages transmitted from the wireless base station, with the plurality of antennas, selecting the received telegram message having the best reception condition from among the telegram messages received with the plurality of antennas, and transmitting a response telegram message to the wireless base station in response to the first telegram message received from the wireless base station; and
  receiving, by the terminal, a second telegram message of the telegram messages transmitted from the wireless base station, with the plurality of antennas, selecting the received telegram message having the best reception condition from among the telegram messages received with the plurality of antennas, and transmitting a response telegram message to the wireless base station in response to the second telegram message received from the wireless base station;
  wherein the terminal station obtains a presence or an absence of BLER and a value of RSSI respectively from the telegram messages received with the plurality of antennas, selects a telegram message having a highest value of RSSI from the received telegram messages having no BLER and, if the telegram message having the highest value of RSSI from the received telegram messages is not found, selects a telegram message having a best reception condition with the plurality of antennas instead of the telegram message having the highest value of RSSI.

* * * * *